United States Patent [19]

Bell et al.

[11] Patent Number: 4,547,444
[45] Date of Patent: Oct. 15, 1985

[54] RECORDING ELEMENT FOR OPTICAL DATA STORAGE

[75] Inventors: Vivien L. Bell, South Woodford; Ian J. Ferguson, Ickleton; Mark J. Weatherley, Harlow, all of England

[73] Assignee: Minnesota Mining and Manufacturing Company, St. Paul, Minn.

[21] Appl. No.: 564,937

[22] Filed: Dec. 23, 1983

[51] Int. Cl.$^4$ .................................................. G03C 1/76
[52] U.S. Cl. ............................................ 430/11; 430/17; 430/18; 430/945; 430/270; 430/495; 430/496; 346/135.1
[58] Field of Search ............... 430/945, 578, 270, 495, 430/496, 14, 17, 18, 11; 346/135.1, 76 L; 428/156, 913

[56] References Cited

U.S. PATENT DOCUMENTS

| | | | |
|---|---|---|---|
| 2,813,802 | 11/1957 | Ingle et al. | 117/33.3 |
| 4,000,492 | 12/1976 | Willens | 346/1 |
| 4,137,077 | 1/1979 | Credelle et al. | 96/1.1 |
| 4,148,636 | 4/1979 | Credelle et al. | 96/1.1 |
| 4,218,689 | 8/1980 | Bloom et al. | 430/945 |
| 4,230,939 | 10/1980 | de Bont et al. | 235/488 |
| 4,259,433 | 3/1981 | Mizobuchi et al. | 430/296 |
| 4,364,986 | 12/1982 | Zwanenburg et al. | 428/156 |

FOREIGN PATENT DOCUMENTS

| | | |
|---|---|---|
| 2005155 | 4/1979 | United Kingdom . |
| 2005457 | 4/1979 | United Kingdom . |
| 2079031 | 1/1982 | United Kingdom . |

*Primary Examiner*—Won H. Louie
*Attorney, Agent, or Firm*—Donald M. Sell; James A. Smith; Mark A. Litman

[57] ABSTRACT

An optical recording element in which information can be recorded and read directly afterwards by means of laser light, comprises a substrate having on at least one side a recording layer including an effective amount of one or more compounds selected from a certain class of trimethine and longer chain aryl polymethine dyes associated with specific counter-ions.

24 Claims, 2 Drawing Figures

RECORDING ELEMENT FOR OPTICAL DATA STORAGE

FIELD OF THE INVENTION

This invention relates to an optical recording element in which information can be recorded and read by means of laser light and, in particular, to an optical recording element comprising a substrate having on at least one side a recording layer including one or more compounds selected from a particular class of polymethine dyes.

BACKGROUND OF THE INVENTION

Continuing advances in information handling technology have led to the requirement for data storage and retrieval systems capable of handling extremely large volumes of information. A proposed method for satisfying this demand is that of optical recording, in particular optical disc recording, which allows recording and accessing of information at very high data rates with a much greater recording density and archivability than is possible with magnetic recording. A highly focussed laser beam is utilized to record and recover information on the optical recording media. The selection and alignment of diode lasers into an optical recording system is discussed by Barolini et al. in I.E.E.E. Journal of Quantum Electronics, 1981, p. 69, and both read and write apparatus are disclosed in British Patent Application No. 2,016,747A.

Many types of recording media have been disclosed for laser writing and these can be divided into two basic sorts: those which require processing after writing and those which can be read immediately after writing. It is the latter type, possessing "direct read after write" capability and commonly known as "DRAW" media, which are of particular interest.

In order to be useful as a light absorbing layer for the recording element, materials must be able to be applied to a substrate in the form of a thin, smooth layer of high optical quality and predetermined thickness and they must absorb at the frequency of the optical source. Various materials have been proposed for the recording media of DRAW systems, including, for example, thin metal films, metal-impregnated polymers and organic dyes. In these cases the laser beam provides a pulse of heat energy to the recording medium which causes a change in surface morphology; i.e., formation of a bump or crater, by ablation, vaporization or melting.

The most common DRAW media are the thin metal films and, of these, tellurium containing mixtures as disclosed in Lou et al., J. Vac. Sci. Technol, 1981, 18, 78, are widely used. However, the preparation of recording elements incorporating tellurium is by a relatively expensive vacuum sputtering technique in which the metal does not adhere well to the substrate. It also presents environmental complications because of its toxicity.

Examples of the use of metal-impregnated polymers in recording elements include the silver-impregnated gelatin systems disclosed in U.S. Pat. No. 4,278,758. Greater sensitivity is claimed for these systems than for the tellurium films, but high concentrations of expensive silver are used in the recording medium.

A possible alternative system uses organic compounds in place of expensive metals. As well as providing advantages of cost, the thermal properties of organic compounds are generally superior since they possess low thermal conductivity and low melting/decomposition temperatures. With the use of such systems it is important that the absorption of dye therein corresponds as closely as possible with the emission of the recording laser. Of the various lasers available, semiconductor laser dioses have the advantages, over conventional gas lasers, of low cost and size and the possibility of easy signal modulation. The problem is, therefore, one of finding organic materials which have all the requisite physical properties and absorb strongly in the region compatible with laser diodes; i.e., the near infrared region of the spectrum, wavelengths between 700 and 1400 nm. The use of hydroxy-squarylium dye for optical data storage is disclosed in Jipson and Jones, J. Vac. Sci. Technol., 1981, 18, 105, but the dye absorbs strongly only in the visible region of the spectrum. Phthalocyanines are disclosed in European Patent Application No. 79200789 and can readily be vapor coated onto a substrate. However, their sensitivity is reduced by their relatively high ablation temperature (300° to 400° C.) and crystallization is always a danger when a coating of pure dye is used.

Dye-in-polymer systems go some way towards avoiding crystallization. An organometallic complex has also been coated out in a polymer binder. Crowly et al., IBM Technical Disclosure Bull, 24, No. 11B, 1982, reports that a nickel dithiene complex dissolved in a film of polystyrene undergoes ablation-typ holeburning with infrared radiation, but no data has been given on the sensitivity of the system. Law et al., Appl. Phys. Lett., 1981, 39, 718, discloses a thiacyanine dye coated in poly(vinyl acetate) solution without any evidence of the formation of microcrystals. However, the intense monomer absorption band observed in solution was lost when the dye was spread in a polymeric binder and the resultant absorption was significantly blue-shifted and reduced in intensity.

As reported above, dye-polymer systems suitable as optical data storage recording media require near infrared absorbing dyes which are compatible with laser diode emission. Heptamethine and longer chain cyanine dyes are known which have absorption maxima in the near infrared region of the spectrum, together with exceptionally high extinction coefficients. However, simple near infrared absorbing cyanine dyes are unsuitable for use as optical data storage media both from solubility considerations and because, when coated out in polymeric binders, their absorption curve is broadened and shifted hypsochromically as reported in Law et al., Appl. Phys. Lett., 1981, 39, 718.

It is highly desirable that the recording layers of an optical recording element have a small thickness; e.g., below 1 $\mu$m and an optical density of about 0.4 or higher. Whilst it has been possible to achieve these desirable criteria with recording layers which consist entirely of dye, heretofore it has not been readily possible to manufacture dye-containing layers of a film-forming polymeric binder which have the desired properties without employing specific binder formulations. In particular, many known dye/binder systems must be used in comparatively large thicknesses of more than 1 $\mu$m to be able to realize the sufficiently high optical density of the layer.

One particular dye/binder system which is able to achieve the desired criteria is disclosed in U.S. Pat. No. 4,364,986. This patent discloses an information recording element for optically recording optically readable information comprising a disc-shaped substrate on one surface of which there is present an optically readable servo track which has at least partially a relief structure of servo areas situted alternately at a higher and lower level and on which servo track there is present, as a recording layer, a mixture of a dye and a copolymer (1:1) of methyl vinyl ether and maleic anhydride or a semi-ester of said copolymer and an aliphatic alcohol which may be substituted with an aromatic radical and contains 1 to 8 carbon atoms.

Our copending British Patent Application No. 8237040 provides an optical recording element in which information can be recorded and read directly afterwards by means of laser light, the element comprising, as a recording medium, an effective amount of one or more dyes of the formula:

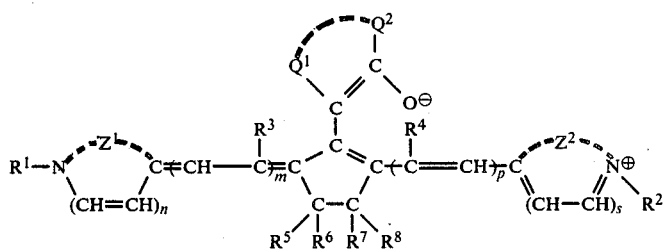

(I)

in which:

m+p=2, preferably m=p=1, n is 0 or 1, s is 0 or 1, $Z^1$ and $Z^2$ independently represent the non-metallic atoms necessary to complete a heterocyclic nucleus of the type present in cyanine dyes, $R^1$ and $R^2$ independently represent an alkyl, substituted alkyl, alkenyl, substituted alkenyl or aralkyl group of up to 20 carbon atoms, $R^3$ and $R^4$ independently represent a hydrogen atom or an alkyl, substituted alkyl, alkenyl, substituted alkenyl, alkoxy or substituted alkoxy group of up to 10 carbon atoms, $R^5$, $R^6$, $R^7$ and $R^8$, which together may not contain more than 12 carbon atoms, independently represent a hydrogen atom, an alkyl, substituted alkyl, alkenyl, substituted alkenyl, aryl or alkaryl group, or one of $R^5$ and $R^6$ together with one of $R^7$ and $R^8$ represent the necessary atoms to complete a carbocyclic ring (e.g., a benzene ring) in which case the others of $R^5$ to $R^8$ are absent, $Q^1$ and $Q^2$ together represent the non-metallic atoms necessary to complete an acidic nucleus of the type present in oxonol or merocyanine dyes.

The elements of that application use a particular highly advantageous class of chain-substituted cyanine dyes. The dyes are advantageous not only in respect of their improved solubility in solvent and binder, but also their spectral characteristic in the near infrared region of the spectrum. The dyes retain a very high absorption in the near infrared when present in a layer in an optical recording element. The combination of infrared wavelength of absorption specificity, high extinction coefficient values and solubility leads to these dyes being particularly useful for laser addressed optical recording elements.

SUMMARY OF THE INVENTION

It has now been found that certain trimethine and longer chain aryl polymethine dyes associated with specific counter-ions have particularly desirable properties for use in optical recording media.

Therefore, according to the present invention, there is provided an optical recording element in which information can be recorded and read directly afterwards by means of laser light, the element comprising, as a recording medium, an effective amount of one or more dyes of the formula:

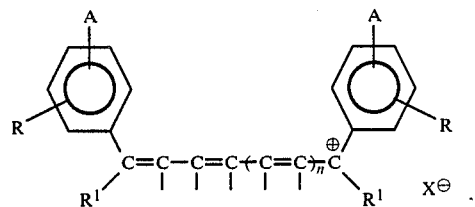

(II)

in which:

n is 0 or an integer, generally 1 or 2, each A independently represents a hydrogen atom or an electron-donating group providing at least one group A is other than hydrogen, each R independently represents a hydrogen atom, one or more substituents on the phenyl ring each selected from alkyl, alkenyl, aryl, alkaryl, alkoxy, N,N-dialkylamino, N-alkylamino, amino, amido, halogen atoms, nitro, cyano, ester; e.g., carboxyalkoxy, aldehyde, keto, carboxylate, sulfonate or alicyclic groups, any of which groups may be substituted, a fused ring or a bond or the atoms necessary to complete a cyclic structure with the adjacent group $R^1$ or the polymethine chain, each $R^1$ independently represents a hydrogen atom, an alkyl, aryl or alkaryl group any of which groups may be substituted, $R^1$ optionally completing a cyclic structure with the polymethine chain, or with the adjacent phenyl ring via the substituent R or A, the free bonds on the polymethine chain being satisfied by substituents independently selected from hydrogen, halogen, hydroxy, alkyl, aryl, the latter two groups being optionally substituted, or the necessary atoms to complete a cyclic structure including at least two carbon atoms in the polymethine chain, and $X^\ominus$ represents an organic ion, the conjugate acid of which has a pKa value less than 7, preferably less than 3, or $FSO_3^\ominus$ or an inorganic ion of the formula:

$$ML_x{}^{n-1}$$

in which M represents B, Al, P, As, Sb or Zn, preferably B or P,

L represents a halogen, preferably F or Cl, x=4, 5 or 6, and n is 1 or 2, the group $X^{\ominus}$ optionally being covalently bonded to the dye cation such that the molecule is a zwitterion.

DETAILED DESCRIPTION OF THE INVENTION

Figure 1:
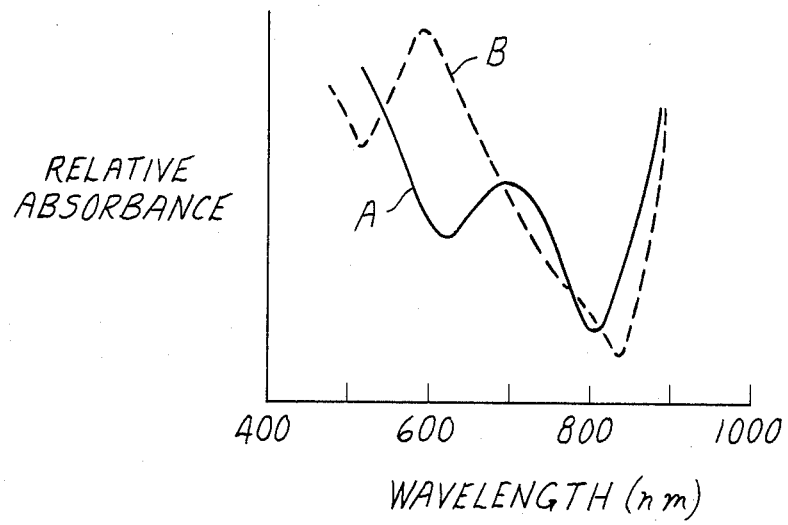
FIG. 1 shows absorption curves for Compounds 1 (curve A) and 2 (curve B) in solution.

The dyes used in the present invention have absorption maxima in the near infrared region of the spectrum, together with high solution extinction coefficients particularly suitable for use in recording media for optical data recording and permit the formation of very thin dye-containing layers which have high optical density and small thickness. A particular advantage is that such dyes are compatible with a wide range of polymeric binders including polystyrene, polyacrylate, polymethacrylate, cellulose, polyester, polyether, polycarbonate, polyamine, polyvinyl-chloride, polyvinyl-alcohol, and copolymers of vinyl-chloride/vinyl-acetate, etc. In some instances a plasticizer may be usefully included in the mixture to achieve the desired deformation capabilities.

Such compatibility, as well as allowing wide scope in optimizing the performance of the medium in terms of optical absorption, heat flow, mass motion and in general sensitivity and stability, permits high optical densities to be achieved at moderate dye to binder ratios in sub micron films. An additional and unexpected advantage is the ability to be solvent coated as "dye only" films without detectable crystallinity in thin film form.

The polymethine dyes used in the invention, particularly tetraaryl polymethine dyes of the above class, exhibit surprisingly good stability properties to light, heat and humidity. The dyes possess absorption maxima in the near infrared region of the spectrum together with high solution extinction coefficients and when coated out as a solid film either with or without a polymeric binder, the dyes exhibit a slight reduction of the extinction coefficient due to an unexpected pronounced broadening of the absorption band. Such a broadening of absorption maxima has been mentioned in U.S. Pat. No. 4,364,986 but only when a specific copolymer binder was used. It was unexpectedly found that this broadening of the absorption maxima of the tetraaryl polymethine dyes was not restricted to use of this specific copolymer and that it occurred in a range of binders both homopolymers and copolymers as well as in dye only films containing no binder. This broad absorption implies that lasers having a range of emission wavelengths can be used with the recording element.

In addition, the dyes have solubility characteristics enabling them to be incorporated into polymeric coatings at concentrations sufficient to give a useful absorption. Thus, the dyes are particularly suitable for use as a recording media in elements for optical data storage which elements are sufficiently stable for storage of information for prolonged periods of time; e.g., archival records.

The elements of the present invention do not rely upon other photosensitive materials to be associated with the recited dyes in the recording medium. The elements perform quite satisfactorily as DRAW media in the absence of any other photosensitive material.

In accordance with a further aspect of the invention, there is provided a method of recording information in digital form and/or reading information stored in digital form which comprises recording said information by means of laser light on an optical recording element in accordance with the invention and/or reading information stored in digital form on a recording element in accordance with the invention by means of laser light. The information may also be recorded in analog form.

The dyes of formula (II) contain at least two aryl groups, more preferably 3 or 4 aryl groups.

At least one of the groups A represent an electron-donating group and preferably each group A is an electron-donating group. The electron-donating groups should have a mesomeric effect rather than a +I effect and may be selected from a wide range of groups; e.g., primary, secondary and tertiary aryl or alkyl amines, halogen, preferably Cl, alkoxy, aryloxy, alkylthio, arylthio, arylphosphorous, etc. Generally the groups A contain less than 25 carbon atoms. Plus I (+I) means a positive inductive effect.

Preferred electron-donating groups A include N,N-dialkylamino groups and alkoxy groups, the alkyl chains of these substituents generally containing less than 12 carbon atoms, preferably less than 5 carbon atoms.

The substituents A are preferably in the ortho or para positions relative to the bond to the polymethine chain.

The groups R and $R^1$ or the cyclic structures completed by these substituents generally contain less than 20 atoms selected from C, N, O and S as their skeletal structure.

The R groups are selected from the general class of substituents recited above, which substituents themselves may be substituted; e.g., with OH groups or by combinations of groups within the general class.

When $R^1$ in formula (II) represents a substituted aryl group, $R^1$ may have the formula:

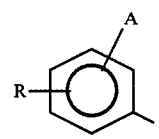

in which A and R are as defined above.

Examples of suitable substituents for R and $R^1$ are known and exemplified in the literature relating to polymethine dyes.

It has been found that the anion associated with the dye has a pronounced effect upon certain properties of the dye and in particular to the compatibility of the dye with binder systems. In the dyes useful in the present invention the anion $X^{\ominus}$ is selected from a particular range of anions.

Exemplary organic anions for $X^{\ominus}$ include alkyl-, alkenyl-, aryl- (including carbocyclic and heterocyclic) and polyoxyalkyl-carboxylic, -sulfonic, -phosphoric or -boric acids, any of which may be substituted, preferably with electron withdrawing groups; e.g., Cl, Br. Other suitable organic ions include phenols substituted with electron withdrawing groups; e.g., $No_2$. Polymeric anions; e.g., polymer groups with acid pendant groups such as carboxyl, phosphonyl, phosphinyl, sulfonyl, sulfinyl and the like are also useful and are included within the term organic anions.

Suitable monocarboxylic acids from which the anion $X^\ominus$ may be derived include optionally substituted alkyl and alkenyl carboxylic acids containing from 1 to 25 carbon atoms; e.g., formic, acetic, propanoic, butyric, lauric, stearic, behenic, oleic and linoleic acids.

The anion $X^\ominus$ may also be derived from dicarboxylic acids; e.g., optionally substituted alkyl and aryl dicarboxylic acids. When the anion is derived from dicarboxylic acids it is possible to associate two chromophore portions with the same anion.

Other carboxylic acids from which the anion $X^\ominus$ may be derived include α-amino substituted carboxylic acids and aryl carboxylic acids; e.g., benzoic and nitrobenzoic acids.

The anion $X^\ominus$ may be derived from alkyl and aryl sulfonic or sulfinic acids; e.g., methyl-sulfonic acid, trichloromethyl-sulfonic acid and trifuloromethyl-sulfonic acid, p-ethyl-benzene-sulfonic acid.

The anion $X^\ominus$ may also be derived from polymeric or copolymeric acids comprising a polymer chain bearing pendant carboxylic, sulfonic or other acid groups.

Preferably, $X^\ominus$ is derived from halo-substituted alkyl or aryl carboxylic or sulfonic acids; e.g., chloroalkyl carboxylic or sulfonic acids, fluoroalkyl carboxylic or sulfonic acids, bromo or iodo alkyl carboxylic or sulfonic acids, particularly trifluoromethyl sulfonic acid, perfluoropropanoic acid, perfluorobutyric acid, perfluoro octanoic acid.

$X^\ominus$ may also be selected from a range of inorganic ions as defined above. Preferred inorganic ions include $FSO_3^\ominus$, $BF_4^\ominus$ and $PF_6^\ominus$.

One class of compounds within the general class of formula (II) are those of the formula:

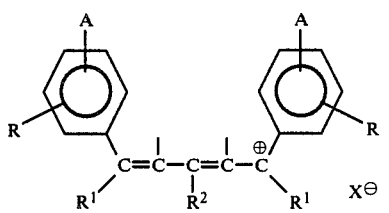
(III)

in which:

A, R, $R^1$, $X^\ominus$ and the free bonds are as defined in formula (II), and $R^2$ represents a hydrogen atom or an alkyl, alkaryl or aryl group, the groups optionally being substituted, with the proviso that at last one of R, $R^1$ and the free bonds of the polymethine chain complete a cyclic structure in the manner defined with respect to formula (II).

The compounds of formula (III) possess at least one cyclic structure in addition to the aryl rings formed separately by the substituents A and $R^1$. The cyclic structures may be formed by three types of bridging:

(a) the two substituents at an end of the polymethine chain are joined by a single bond or by one or more carbon or heteroatoms; e.g.,

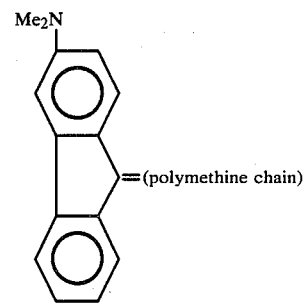

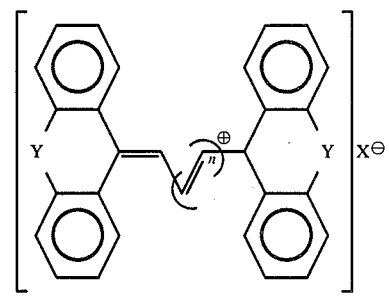

in which Y represents a carbon atom or a heteroatom; e.g., nitrogen.

(b) at least one of the terminal substituents is joined to the polymethine chain; e.g.,

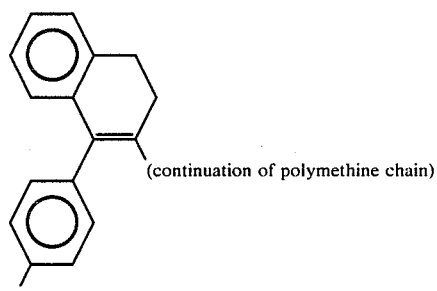

(c) the polymethine chain is bridged; e.g., as with a cyclopentane or cyclohexene ring as in the formula:

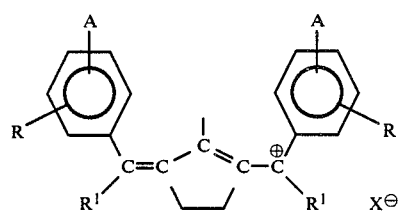

Longer polymethine chains are also possible.

Combinations of the three types of bridging may also be present in a compound; e.g.,

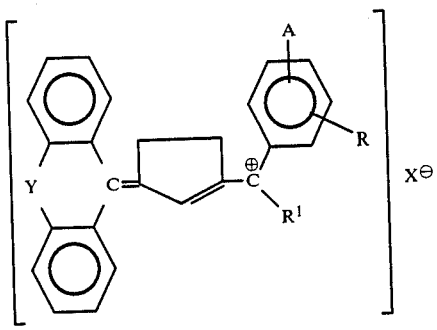

in which $X^{\ominus}$ and Y are as defined above.

Polymeric forms of the above compounds may also be used in the elements of the invention. The dye itself may be incorporated into the polymer, for example, by copolymerization or as pendant groups on a suitable backbone. Alternatively, the complementary anion can be polymeric in structure.

A large number of compounds within the scope of formula (II) are known. U.S. Pat. Nos. 2,813,802 and 3,099,630 disclose dyes of the general class:

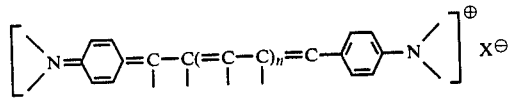

in which:

n is 0 or an integer, and $X^{\ominus}$ is the anion of a strong protonic acid or a polymeric anion.

The compounds are stated to be useful in the contruction of infrared filters; e.g., for use upon window glass or as protective lenses.

Other compounds and their preparation within the scope of formula (II) are disclosed in Japanese Patent Specification No. 56-019358, J.A.C.S. 1958, 80, 3772, Helv. Chim. Acta, 1945, 28, 600, Chem. Ber. 1959, 92, 2309, Chem. Ber., 1960, 93, 1533, and Helv. Chem. Acta, 1941, 24, 369E. Exemplary uses for the dyes are in electrophotographic materials.

U.S. Pat. No. 4,364,986 discloses the use of 1,5-bis-phenyl-1,5-(p-dimethylaminophenyl)-2,4-pentadienylium chloride in a recording layer in conjunction with a specific binder consisting of a copolymer (1:1) of methyl vinyl ether and maleic anhydride or a semi-ester thereof. It has been found in accordance with the present invention that the same dye cation associated with an anionic selected from the group defined above for $X^{\ominus}$ in place of $Cl^{\ominus}$ has significantly improved properties as will be exemplified hereinafter.

The optical recording element of the invention may be in the form of a support having a recording layer coated thereon comprising one or more dyes of formula (II) optionally together with a binder, or the element may be in the form of a self-supporting structure; e.g., a cast film, comprising a dye of formula (II) and a binder. The dye must be present in the region of the surface of the recording layer in a sufficient amount to absorb an effective amount of the exposing radiation to produce a detectable mark on the surface thereof. It is not possible to generally quantify the minimum amount of dye required for optical recording either in terms of coating weights or optical density of the recording layer or element since the minimum amount will vary according to the dye, the thickness of the recording layer or the construction of a self-supporting element and the binder present. For example, a thick layer of recording medium having a high optical density and coating weight of dye may have inferior performance to a thin layer having a lower optical density and coating weight.

The thickness of the coated recording layer is an important factor in controlling the efficiency of the laser in forming pits since good writing sensitivity requires that writing energy be effectively coupled into the recording layer. A. E. Bell and F. W. Spong, I.E.E.E. Journal of Quantum Electronics, July 1978, 487, discloses, in general, that optimum write situations are obtained when the recording layer has a thickness about one quarter the wavelength of the recording light. In recording elements of the present invention sensitivity is improved as the thickness of the recording layer is reduced below 1 m and in preferred embodiments the thickness is in the range from 30 to 400 nm, although a general range of 10 to 1000 nm may be used.

The recording layer is generally coated onto a substrate which acts as a support. The support may be substantially any solid material, either flexible or rigid including polymeric materials; e.g., polyacrylates, polyamides, polycarbonates, polyesters, polyolefins, polysiloxanes, polyurethanes and polyvinyl resins; ceramic or glass materials; fibrous materials and metals. The support must have a melting point high enough to avoid deformation during writing of information. Also the surface of the substrate which is to be coated should be smooth and free of random surface irregularities, although it may be flat, pre-grooved or may include predetermined surface irregularities capable of being read by laser light in the final element to provide an indexing function or the like.

A light reflecting layer is preferably provided between the substrate and the recording layer. Suitable materials include aluminum, copper, chromium, gold and rhodium. The thickness of the light reflecting layer should be sufficient to reflect a significant amount of the recording light. Leveling and/or priming layers may also be applied to the substrate before application of the reflective coating and/or dye containing layer. If the reflecting material itself can be formed so it is a self-sustaining layer and optically smooth, it may constitute the substrate.

A recording element in which there is both a reflecting layer and the recording layer is termed a bilayer system. This can be expanded to a trilayer system by the insertion of a spacer between the reflecting layer and the recording medium. The spacer may confer smoothness, help control the thermal performance of the medium and protect the reflecting layer. A dielectric spacer may comprise vacuum deposited $SiO_2$, or an organic polymer which does not contain any of the light-absorbing dye. The dielectric spacer is preferably transparent to the laser beams used in reading and writing on the recording layer. Examples of the construction of such recording elements are disclosed in Bartolini et al., J. Quantum Electronics, 1981, page 69.

In the recording elements of the present invention the recorded information is carried in the form of marks; e.g., about 1 micron in size, in the recording layer. Because of the high density of the information, dust or other foreign material on the top surface of the recording layer would cause significant errors. Therefore, in one embodiment of recording elements of the present invention a protective layer at least 0.6 m thick is provided on top of the recording layer to separate dust and other particles from the recording layer. The laser beam is sharply convergent at the top surface of the recording layer and accordingly any dust particles on the protective layer would be out of focus with respect to the laser beam and thus not affect the reading and writing process. The protective layer can be made of any material which is transparent to laser beams used in reading and writing on the recording layer and it can either be directly in contact with the recording layer or separated from it by an air, nitrogen gap or vacuum gap. Suitable materials which can be used for the protective coating include glass, poly(methyl methacrylate), polycarbonates and polyesters.

Preferably the recording elements of the invention are double-sided comprising a planar substrate optionally in the form of a disc, having on each major surface a reflecting layer, above which is coated the recording medium and optionally a protective layer.

A wide range of organic binders may be used to prepare the recording layer and elements for use in the invention. The binder should be capable of film formation in the recording element and be pellucid: cloudiness or milkiness of the binder at the writing laser emission are undesirable in the recording element. The binder may be colored and exhibit a degree of infrared absorbance at the writing laser emission. The binder must also adhere to the adjacent layers of the recording element; e.g., substrate, reflecting spacer or protective layers.

In general, thermoplastic polymers are preferred, particularly those polymers having a Tg in the range 70 to 115 C. or capable of being formulated with plasticizers to provide a binder medium having a Tg in this range. Useful binders include cellulose acetate butyrate, polystyrene, polysulfonamide, polycarbonates (e.g., those commercially available from General Electrics Plastics under the trade name Lexan), cellulose nitrate, hydroabietyl alcohol (e.g., that commercially available from Hercules Chemical Company under the trade name Abitol AUK257), polyesters; e.g., polyacrylates [poly(ethyl methacrylate), poly(methyl methacrylate) poly(isobutylmethacrylate), poly(biphenyl)acrylate], poly(vinyl butyral), poly(vinyl acetate), polyethers, polyamines, poly(vinyl chloride), poly(vinyl alcohol) and copolymers such as arising from vinyl chloride and vinyl acetate monomers, and hydrogenated rosin ester (e.g., Staybelite Ester 10, commercially available from Hercules Powder Company). These binders may be used either singly or in combination with another. Preferred binders include polystyrene, poly($\alpha$-methylstyrene) and poly(methy methacrylate), either alone or containing Staybelite Ester 10.

Anionic binders such as those derived from carboxylic acid containing copolymers may also be used. Such binders may be associated with the dye cation.

Crosslinked binders; e.g., epoxy resins, may also be used but generally with some loss in sensitivity. Both natural and synthetic binders are useable.

It is generally preferred that the recording layer be an amorphous material since pronounced crystallization or graininess in the film may cause increased noise levels making the material unsuitable as a high quality recording medium. However, it is possible that the dye be present in the recording medium as microcrystals. Accordingly, the dye may either be solubilized in the binder or very finely dispersed. The former is preferred. For dispersions the particle size must be very much less than 1 micron.

Crystallinity in the dye/polymer films can be detected visually by haziness of the coated layer or in extreme cases, as a metallic, highly reflective appearance to the film compared to amorphous films which present a completely transparent appearance.

The particular dye/binder ratio selected is a balance between one end of the range where a high dye/binder ratio leads to the possibility of undesirable crystallization, whilst at the other extreme too little dye may result in insufficient heat transfer from the dye to the binder to cause melting and hence prevent recording. In a control experiment without dye present, irradiation of the polymeric binder with the laser diode caused no marking of the surface. Another limitation on increasing the dye/binder ratio is the solubility of the dye in the coating solution. In practice, dye/binder weight ratios may range from 1:30 to 5:1 and preferably from 1:20 to 2.5:1.

In order to achieve the desired dye/binder ratios in a coating solution and obtain viscosities suitable for spreading, the solubility of the dye is preferably at least 10 mg/ml in the solvent chosen and more preferably at least 30 mg/ml. The dyes of formula (II) have the desired solubility in organic solvents as well as in polymeric binders. With such dyes, ratios of dye/polymer of 1:1 w/w can be coated from solutions containing 6% w/v total solids without crystallization occurring.

The solvent used for preparing the coating composition may be selected from a wide range of known solvents such as dichlorinated solvents; e.g., dichloromethane and 1,2-dichloroethane, or ketonic solvents; e.g., cyclohexanone, or aromatic solvents; e.g., xylene. The solvents can be used alone or in combination, the choise being governed to some extent by the particular dye/binder system and by the method of coating used.

Suitable methods of coating the compositions include handcoating, dipcoating, spincoating and webcoating. A very suitable process is, in particular, the centrifugal spincoating process. According to this process, the substrate to be covered is laid on a turntable and a quantity of solution is then provided on the substrate. By rotating the substrate, the liquid will spread circularly over the surface of the substrate. It has been found in experiments that very thin layers can be obtained by means of the centifuging process, the thickness of which depends inter alia on the rotation speed of the substrate and the viscosity of the solution to be spread. It has been found that layers having a thickness smaller than 1 $\mu$m are obtained if the viscosity of the solution lies in the order of magnitude of a few cP, for example, up to 10 cP, and a speed of rotation is used of approximately 500 to 2500 rpm. The percentage of solid substance in the solution must also be preferably low and generally be at most 5 to 10% by weight. Film thicknesses less than 0.3 $\mu$m can readily be achieved in this manner.

It is not essential for the dyes to be applied together with a polymeric binder and it is possible to coat the dyes on a substrate in the form of a simple solution and rapidly evaporate the solvent; e.g., in an air current, to leave an amorphous film of dye on the surface of the substrate. It has been found that such coatings provide better sensitivity, comparable to that of a dye/binder system, although in some cases, the films may have inferior stability relative to the dye/polymer systems.

In an illustrative recording system embodying the principles of the present invention, a record blank comprising a substrate coated with a reflective layer, a recording medium of the invention and optional protective layer in the form of a disc is subjected to rotation at a constant rotational speed while a beam of light from a light source (e.g., a laser providing light at a wavelength at which the recording medium is absorbing) is focussed on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes.

Information tracks comprising a succession of spaced pits are formed in the coated surface of the disc, the pits appearing in those surface regions exposed to high level beam, due to vaporization or melting of the absorptive layer material in response to the high level beam exposure. Variations in the length and separation of the pits are representative of the recorded information. Where a continuous sequence of pictures is to be recorded, a spiral information track may be formed by providing relative motion, in a radiation direction and at a constant rate during the recording between the recording beam and the rotating disc. Alternatively, in the absence of such relative motion during the recording, a circular information track may be formed.

The result of the above-described recording process is the information of an information record of a form which facilitates recovery of the recorded information by optical playback processes. The information track of such an information record comprises undisturbed surface regions that exhibit very low reflectance at an appropriate light frequency, alternating with pit regions, formed by the ablation process, that exhibit appreciably high reflectance at the same light frequency. A high ratio between the reflectance of the pit regions and the reflectance of the intervening (undisturbed surface) regions is readily provided. Media exhibiting lower reflectivity after writing may also be made.

In playback operations pursuant to the principles of the present invention, a light beam is focussed upon the information track of a rotating information record of the above described type. The playback beam has a constant intensity at a level insufficient to effect ablation of the disc coatings, and is of a frequency substantially corresponding to that at which the undisturbed surface regions exhibit an antireflection condition. A photodetector, positioned to receive light reflected from the successive regions of the information track as they pass through the path of the focussed light, develops a signal representative of the recorded information. A high readout contrast ratio (due to the large differences in reflectance of the pit regions and the intervening track regions, at the light frequency of the playback beam) is readily obtained, permitting recording of the recorded video signals with an excellent signal-to-noise ratio.

As well as finding utility as elements for writing and storing optical data and thereafter retrieving said data, the elements of the invention may be used as a master element for the production of other elements which are capable of being read by laser light. For example, an element of the invention may be used to record information by means of laser light ablating background areas and the resulting element may be used as a mold to produce a positive replica having surface irregularities complementary to those recorded in the recording media of the master element. The replica may be produced by coating a curable resin system; e.g., an epoxy resin system over the surface of the element bearing recorded information and exposing the resin to ultraviolet light thereby curing the resin. The replica may then be stripped from the master element and its surface will possess a series of deformations corresponding to the deformations in the surface of the recording media. These surface irregularities may be read by low laser power light after further processing; e.g. deposition of a reflecting layer.

The following compounds have been synthesized according to methods disclosed in the prior art:

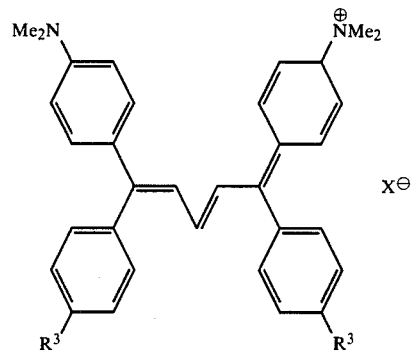

| Compound No. | $R^3$ | $X^\ominus$ |
|---|---|---|
| 1 | $NMe_2$ | $CF_3SO_3^\ominus$ |
| 2 | H | $CF_3SO_3^\ominus$ |

The solution spectra of the compounds dissolved in chloroform were measured together with the absorption spectra of the compounds when coated on a polyester base film using a coating composition comprising poly(methyl methacrylate)/dye (ratio 1:1 w/w) in dichloromethane/1,2-dichloroethane solvent (1/1 w/v).

Figure 2:
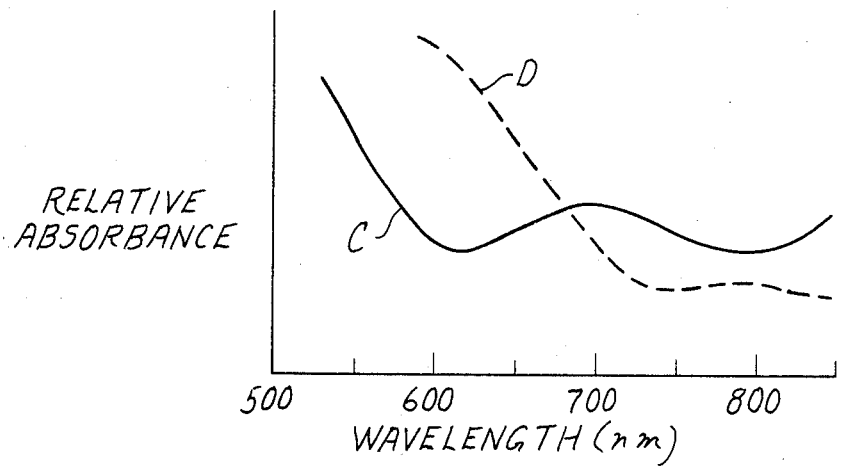
FIG. 2 shows absorption curves for Compounds 1 (curve C) and 2 (curve D) in poly(methyl methacrylate) binder.

FIGS. 1 and 2 of the accompanying drawings represent absorption spectra for Compound Nos. 1 and 2 in solution (A and B) and in a binder (C and D) coating, respectively. Curves A and C represent the spectra of Compound No. 1 and Curves B and D represent the spectra of Compound No. 2.

Comparison of the Figures illustrates that the absorption bands of the dyes broadens significantly in a binder system. This is of significant practical value since it allows a single dye to be compatible with a range of laser diodes and good ablation will still be achieved even if, as often happens, the emission of the laser diode shifts slightly with age.

By adjusting substituents on the dye, it is possible to control the position of the absorption band and, as alternative laser sources become available from 700 to 1400 nm, then dyes can be chosen from the compounds covered by the various structures, and can be used together to provide good sensitivity at wavelengths matching the source emission.

The dyes have surprisingly good stability. Compound Nos. 1 and 2 were coated on a polyester film from a simple solution in dichloromethane/1,2-dichloroethane to provide a solid coating of dye, and in a binder formulation containing poly(methyl methacrylate) (PMMA) (binder/dye-1/1 w/w). The transmissive optical density at 830 was measured and then remeasured after storage under various conditions. The change in optical density (Δ o.d.) was calculated and expressed as a percent change. The results are reported in the following Table 1.

TABLE 1

| Storage Conditions | Compound No. 1/ PMMA (1/1) Δo.d. (time) | Compound No. 2/ PMMA (1/1) Δo.d. (time) | Compound No. 1 Film Δo.d. (time) | Compound No. 2 Film Δo.d. (time) |
|---|---|---|---|---|
| r.t./amb. R.H. dark | 3% gain (11 weeks) | 0% change (6 weeks) | | |
| 75 C/amb. R.H. dark | 4% gain (11 weeks) | | <1% loss (10 days) | 8% loss (10 days) |
| 50° C./60% R.H. dark | 6% loss (6 weeks) | | <5% loss (5 weeks) | ~40% loss (5 weeks) |
| r.t./amb. R.H. light | <4% loss (10 weeks) | <12% loss (12 weeks) | | | r.t. = room temperature (21° C.)
amb. R.H. = ambient relative humidity (40 to 50%)

It will be noted that Compound No. 1 exhibits better stability than Compound No. 2.

Other compounds suitable for use as dyes in the elements of the invention which have been prepared are shown in the following Table 2.

TABLE 2

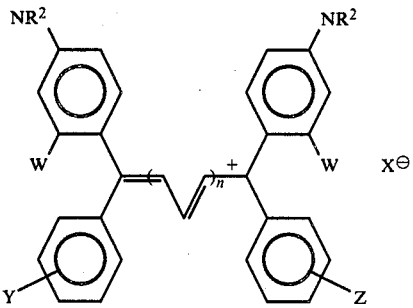

| Dye No. | n | R | W | Y | Z | X |
|---|---|---|---|---|---|---|
| 3 | 1 | Me | H | 4-Cl | 4-Cl | CF$_3$SO$_3^-$ |
| 4 | 1 | Me | H | 4-OMe | 4-OMe | p-MePHSO$_3^-$ |
| 5 | 1 | Me | H | 4-OMe | 4-OMe | CF$_3$SO$_3^-$ |
| 6 | 1 | Et | H | 4-NEt$_2$ | 4-NEt$_2$ | p-MePHSO$_3^-$ |
| 7 | 1 | Et | H | 4-NEt$_2$ | 4-NEt$_2$ | CF$_3$SO$_3^-$ |
| 8 | 2 | Me | H | H | H | CF$_3$SO$_3^-$ |
| 9 | 2 | Me | H | 4-NMe$_2$ | 4-NMe$_2$ | CF$_3$SO$_3^-$ |
| 10 | 2 | Me | H | 4-NMe$_2$ | 4-NMe$_2$ | F$_5$C$_2$C$_6$F$_4$SO$_3^-$ |
| 11 | 1 | Me | H | 4-NMe$_2$ | 4-NMe$_2$ | F$_5$C$_2$C$_6$F$_4$SO$_3^-$ |
| 12 | 1 | Me | H | 4-NMe$_2$ | 4-NMe$_2$ | CCl$_3$COO$^-$ |
| 13 | 1 | Me | H | 4-NMe$_2$ | 4-NMe$_2$ | CF$_3$COO$^-$ |
| 14 | 1 | Me | H | 4-NMe$_2$ | 4-NMe$_2$ | FSO$_3^-$ |
| 15 | 1 | Me | H | 4-NMe$_2$ | 4-NMe$_2$ | C$_3$F$_7$COO$^-$ |
| 16 | 1 | Me | H | 4-NMe$_2$ | 4-NMe$_2$ | BF$_4^-$ |
| 17 | 1 | Me | H | 4-NMe$_2$ | 4-NMe$_2$ | PF$_6^-$ |
| 18 | 3 | Me | H | 4-NMe$_2$ | 4-NMe$_2$ | F$_5$C$_2$C$_6$F$_4$SO$_3^-$ |
| 19 | 1 | Me | H | 4-NMe$_2$ | H | CF$_3$SO$_3^-$ |
| 20 | 1 | Me | Me | 4-NMe$_2$ | H | CF$_3$SO$_3^-$ |

Additional dyes for use in the invention which have been prepared include:

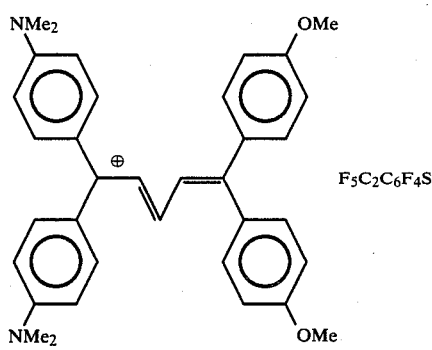

Dye No. 22

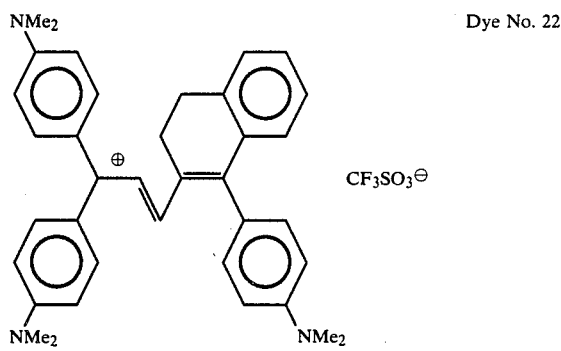

Dye No. 23

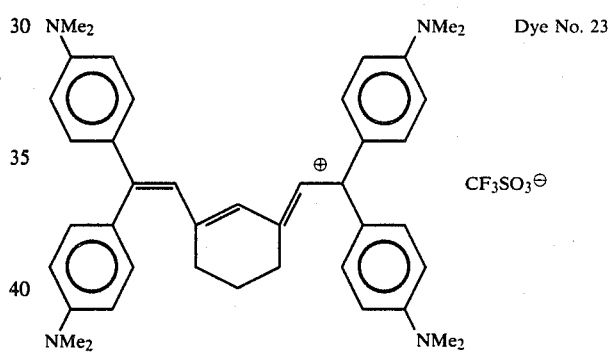

The invention will now be illustrated by the following Examples:

EXAMPLE 1

Dye No. 1 (0.03 g) and poly(methyl methacrylate) (PMMA) (0.03 g) were dissolved in dichloromethane/1,2-dichloroethane (1/1 v/v) (1 ml). The mixture was allowed to stand until the polymer was completely dissolved and the solution was then coated onto subbed polyester base using a R. K. Instruments Ltd., K-bar handcoater, No. 1 and air dried. The coated base exhibited two broad absorptions with $\lambda_{max}$ at 810 and 620 nm, and O.D.=0.82 at 830 nm.

The recording layer, which had a thickness of about 0.1 μm, was subjected to ablation using a Hitachi Laser Diode HLP 1400 emitting at 830 nm. Formation of pits was observed through an optical microscope at 500× magnification when pulses ≧6.0 mW for 50 ns were applied (ablation threshold).

EXAMPLES 2 TO 4

The procedure of Example 1 was repeated using different binders, dyes and binder/dye ratios as reported in Table 3.

EXAMPLE 5

Dye No. 1 (0.2 g) and poly(isobutyl methacrylate) (4.0 g) were dissolved in cyclohexanone (8 ml) and Caromax 18 (supplied by Carless Solvents, boiling point 161° to 181° C.) (1.5 ml). The mixture was screen-printed onto subbed polyester base using a 185 threads/cm mesh. The mixture flowed after printing causing the layer to become even. The ablation threshold properties of the coated base are reported in Table 3.

EXAMPLES 6 TO 34

The procedure of Example 1 was repeated using different binders, dyes and dye/binder ratios. Table 3 reports the formulations with corresponding ablation sensitivities. The coating solvent was dichloromethane/1,2-dichloroethane (1:1) except where otherwise stated.

TABLE 3

| Example No. | Dye/Polymer | dye/polymer ratio | $\lambda_{max}$/nm | O.D. at 830 nm | Ablation Threshold |
|---|---|---|---|---|---|
| 1 | Dye No. 1 (0.03 g)/PMMA (0.03 g) | 1/1 | 810, 620 | 0.82 | 6.0 mW/50 ns |
| 2 | Dye No. 2 (0.03 g)/PMMA (0.03 g) | 1/1 | 730 | 1.12 | 6.0 mW/100 ns |
| 3 | Dye No. 2 (0.03 g)/PMMA (0.02 g)/Staybelite E10 (0.01 g) | 3/1/1 | 730 | 1.06 | 5.0 mW/50 ns |
| 4 | Dye No. 2 (0.03 g)/(Polybiphenylacrylate) (0.03 g) | 1/1 | 750–850 | 1.22 | 10.0 mW/50 ns |
| 5 | Dye No. 1/poly(isobutylmethacrylate) | 1/20 | — | — | 6.3 mW/5.0 μs |
| 6 | Dye No. 3/polycarbonate (Lexan 145) | 1/3 | — | 0.48 | 6 mW/950 ns |
| 7 | Dye No. 4/PMMA/Staybelite E10 | 3/2/1 | 740 | 0.93 | 6 mW/205 ns |
| 8 | Dye No. 5/PMMA/Staybelite E10 | 3/2/1 | 740 | 1.03 | 6 mW/260 ns |
| 9 | Dye No. 6/poly(vinyl methyl ketone) | 1/1.6 (acetone) | *808 | 0.35 | 6 mW/3.4 μs |
| 10 | Dye No. 7/styrene Maleic anhydride copolymer | 1/1.4 (acetone) | *815 | 1.23 | 6 mW/330 ns |
| 11 | Dye No. 8/PMMA | 1/1 | 775 | 1.20 | 6 mW/205 ns |
| 12 | Dye No. 9/PMMA | 1/1 | 850–950 | 1.10 | 6 mW/205 ns |
| 13 | Dye No. 10/Butvar B76 | 1/1 | 813 | 0.66 | 5.45 mW/160 ns |
| 14 | Dye No. 11/PMMA | 1/1 | 640, 740 | 0.15 | 5.45 mW/0.77 μs |
| 15 | Dye No. 12/PMMA | 1/1 | 826 | 0.38 | 4.9 mW/0.77 μs |
| 16 | Dye No. 12/PBPA | 1/1 | 831 | 0.35 | 4.9 mW/0.95 μs |
| 17 | Dye No. 12 only | 1/0 | 825 | 0.53 | 4.9 mW/0.25 μs |
| 18 | Dye No. 13/PMMA | 1/1 | 796 | 0.65 | 4.9 mW/0.33 μs |
| 19 | Dye No. 13/PBPA | 1/1 | 824 | 0.80 | 4.9 mW/0.33 μs |
| 20 | Dye No. 13 only | 1/0 | 792 | 0.67 | 4.9 mW/0.205 μs |
| 21 | Dye No. 14/PMMA | 1/1 | 796 | 0.60 | 4.9 mW/0.50 μs |
| 22 | Dye No. 14/PBPA | 1/1 | 824 | 0.72 | 4.9 mW/0.41 μs |
| 23 | Dye No. 14 only | 1/0 | 824 | 0.58 | 4.9 mW/0.26 μs |
| 24 | Dye No. 15/PMMA | 1/1 | 800 | 0.57 | 4.9 mW/0.77 μs |
| 25 | Dye No. 15 only | 1/0 | 790 | 0.51 | 4.9 mW/1.45 μs |
| 26 | Dye No. 16/PMMA | 1/1 | 827 | 0.84 | 4.9 mW/1.15 μs |
| 27 | Dye No. 17/PMMA | 1/1 | 811 | 0.72 | 4.9 mW/0.95 μs |
| 28 | Dye No. 18/polycarbonate (Lexan 145) | 1/1 | 636,826 | 0.17 | 5.45 mW/1.45 μs |
| 29 | Dye No. 19/PBPA | 1/1 (chloroform) | **805 | 0.76 | 6 mW/670 ns |
| 30 | Dye No. 20/PBPA | 1/1 (chloroform) | **805 | 0.52 | 6 mW/670 ns |
| 31 | Dye No. 21/polyvinylacetate | 1/1 | 617 | 0.09 | 5.45 mW0.77 μs |
| 32 | Dye No. 22/PBPA | 1/1 (chloroform) | **805 | 0.74 | 6 mW/2.2 μs |
| 33 | Dye No. 23/poly(methylstyrene) | 1/1 (MEK) | **805 | 0.65 | 6 mW/9.8 μs |
| 34 | Dye No. 24/PMMA | 1/1 (chloroform) | | 0.46 | 6 mW/670 ns |

*in methanol
**in ethanol
MEK — methyl ethyl ketone

EXAMPLES 35 TO 38

The substrates in these Examples were solid poly(methyl methacrylate) discs coated with a reflective layer of aluminum (bilayer) and in some cases with an additional vapor deposited layer of SiO₂ (trilayer).

These elements were prepared by spin coating with solutions of 2% solids (Dye No. 2 and PMMA) (1:1 w/w), or Dye No. 2 alone, in 1,2-dichloroethane/cyclohexanone (in 3:1 to 1:1) ratio). The spinning rates were 1000 to 2000 rpm and the samples were heated at 75° C. for 5 minutes after spinning.

The ablation threshold and specular reflection measured at 800 nm at 30° with a reflectance spectrophotometer are reported in Table 4.

EXAMPLES 39 TO 42

The procedures of Examples 35 to 38 were repeated using Dye No. 1 in place of Dye No. 2. The properties of the elements are reported in Table 4.

TABLE 4

| Example No. | Element Configuration | Ablation threshold | Reflectivity at 800 nm (30°) |
|---|---|---|---|
| 35 | Bilayer Dye No. 2 + PMMA/Al | 10 mW/100 ns | 13% |
| 36 | Trilayer Dye No. 2 + PMMA/SiO₂Al | 12 mW/100 ns | 18% |
| 37 | Bilayer Dye No. 2/Al | 8 mW/50 ns | 17% |
| 38 | Trilayer Dye No. 2/SiO₂Al | 8 mW/50 ns | 8% |
| 39 | Bilayer Dye No. 1 + PMMA/Al | 16 mW/50 ns | 17% |
| 40 | Trilayer Dye No. 1 + PMMA/SiO₂/Al | 14 mW/50 ns | 12% |
| 41 | Bilayer Dye No. 1/Al | 6 mW/50 ns | 20% |
| 42 | Trilayer Dye No. 1/SiO₂/Al | 6 mW/50 ns | 5.6% |

EXAMPLE 43

This Example demonstrates that variation in film thickness and optical density is readily possible by variation of the coating formulation.

A polyester base was coated adopting the procedure of Example 1 using K-bar No. 0 or 1, with formulations comprising Dye No. 2 PMMA and as a solvent 1,2-dichloroethane/dichloromethane. The formulations used and the properties of the coatings are reported in the following Table 5. Laser ablation data on similar elements is reported in Table 3.

TABLE 5

| Coating formulation | | | K-bar No. | Film Thickness (μm) | Optical Density at 830 nm |
|---|---|---|---|---|---|
| Wt. % PMMA | Wt. % Dye 2 | 1,2-dichloroethane: dichloromethane | | | |
| 3 | 3 | 1:1 | 0 | 0.10 | 0.72 |
| 3 | 3 | 1:1 | 1 | 0.11 | 1.12 |
| 2 | 2 | 1:1 | 0 | 0.07 | 0.53 |
| 2 | 2 | 1:1 | 1 | 0.09 | 0.72 |

EXAMPLES 44 TO 49

30 cm diameter PMMA discs having a reflective layer of vapor deposited aluminum were spin coated by flooding the surface with coating formulation at 100 rmp and then spun dry at 625 rpm.

Examples 44 to 48 employed Dye No. 1 in different concentrations dissolved in 1,2-dichloroethane/cyclohexane (4:1). Reading information was possible on all these discs after addressing with a laser power less than 10 mW and pulse lengths of 0.6 μs.

Example 49 included PMMA binder in a 1:1 dye:-binder ratio and spin coating was performed at 1500 rpm. The element exhibited good sensitivity to laser address, CNR > 50 dB with laser pulses of 8 mW/0.6 μs at a linear velocity of 10 m/s.

The coating formulations and film properties are reported in the following Table 6.

TABLE 6

| Example No. | % Dye 1 in Coating Solution w/v | % reflectivity (30°) at 820 nm | Thickness of film/nm |
|---|---|---|---|
| 44 | 0.5 | 41.5 | 43 |
| 45 | 1.0 | 10.7 | 93 |
| 46 | 1.5 | 19.0 | 146 |
| 47 | 2.0 | 21.4 | 196 |
| 48 | 2.5 | 22.5 | 222 |
| 49 | 1.75 (PMMA 1.75) | 19.0 | 198 |

EXAMPLE 50

Comparison with U.S. Pat. No. 4,364,986

Dye No. 1 of the invention was compared with compound $K_2$ of U.S. Pat. No. 4,364,986. The two dyes had identical cations but different anions (Dye No. 1: $CF_3SO_3^{\ominus}$, $K_2$ $Cl^{\ominus}$).

Coatings were made with a K-bar No. 1 on a subbed polyester base and the optical density at 830 nm and laser ablation threshold measured. The details are reported in the following Table 7.

TABLE 7

| | Weight* | Binder + weight | Crystallization of layer | Optical Density | Ablation Threshold |
|---|---|---|---|---|---|
| $K_2$ | 20 mg | none | yes | 0.59 | 4.9 mW/1.75 μs |
| $K_2$ | 20 mg | PMMA 20 mg | yes | 0.57 | 4.9 mW/1.75 μs |
| Dye No. 1 | 20 mg | PMMA 20 mg | no | 0.79 | 5.45 mW/0.16 μs |
| Dye No. 1 | 20 mg | none | no | 0.60 | 4.9 mW/0.21 μs |

*in 1 ml 1:1 v/v dichloromethane:1,2-dichloroethane

Dye No. 1 of the invention exhibits a freedom from crystallization (as assessed visually), an improved optical density and much improved sensitivity over the prior art.

The binder of Example 1 of U.S. Pat. No. 4,364,986 was prepared. The solution was diluted with 2:1 v/v n-butanol-methanol to give a solution containing 1% of binder.

10 mg of $K_2$ were added to 1 ml of binder solution. Coatings made with a No. 1 K-bar on subbed polyester were satisfactory being free from crystallization.

A similar formulation containing 20 mg $K_2$ could not be prepared because of the insolubility of $K_2$. The highest optical density attainable with dye $K_2$ was found to be in the range 0.4 to 0.5 (measured at 830 nm).

10 mg of $K_2$ in 1 ml of the above binder (1%) coated as before exhibited 7.5% loss in optical density after aging for 7 days at 70 C/85% RH in the dark. Optical density before aging was 0.43 at 830 nm.

20 mg of Dye No. 1 in accordance with the invention in 1 ml of the above binder (1%) exhibited 1.6% loss in optical density after aging under identical conditions. Optical density before aging was 0.64 at 830 nm.

The above aging stability assessment was repeated for each dye in formulations comprising 20 mg dye and 20 mg PMMA in 1 ml 1:1 v/v dichloromethane:1,2-dichloroethane.

The layer containing $K_2$ exhibited at 10.5% loss in transmissive optical density in 1 week whereas that containing Dye No. 1 in accordance with the invention exhibited no measurable loss in 18 days.

EXAMPLE 51

A rigid and flat poly(methyl methacrylate) disc of 300 mm diameter and approximately 1.2 mm thick, not possessing a subbing photopolymer replication layer or a reflective layer, was spin coated with a solution of Dye No. 1 at 1% w/w in 1,2-dichloroethane/cyclohexanone (4:1) at 625 rpm. The dye layer was then overcoated with a vacuum-deposited layer of copper.

The dye layer was then addressed with a laser beam (approximately 820 nm) which was passed through the substrate whilst the disc was being rotated at 900 rpm. Information was written at 13 milliwatts power at a pulse frequency of 1.6 MHz. On reading with the same laser at 1 millivolt the C.N.R. was found to be 27.2 dB.

EXAMPLE 52

Preparation of dimethyl (4-(1,5,5,-tris(p-dimethylamino)phenyl)-2,4-pentadienylidene)-2,5-cyclohexadien-1-ylidene)ammonium salt of copolymer of methyl methacrylate and methacrylic acid.

Dimethyl(4-(1,5,5,-tris(p-dimethylamino)phenyl)-2,4-pentadienylidene)-2,5-cyclohexadien-1-ylidene)ammonium trifluoromethylsulfonate was converted to the free base by mixing 1.8 g of the trifluoromethanesulfonate salt and 1.5 ml of 10% sodium hydroxide solution in 50 ml ethanol and 100 ml toluene. The mixture was heated on a steam bath and the broen solution was then poured into a separating funnel and washed with dilute sodium chloride solution (2×50 ml). The aqueous layers were re-extracted with toluene (2×50 ml) and the combined organic layers concentrated in vacuo. to 80 ml. To this was added, with stirring 1 g of poly(methyl methacrylate-methacrylic acid), 75-25 ratio, from Windsor Laboratories Ltd.) dissolved in 30 ml ethyl methyl ketone. The mixture was evaporated to dryness, giving a shiny black residue, yield 2.3 g, decomp. by 175 C.

A saturated solution in ethyl methyl ketone was coated onto subbed polyester base using a K-bar. After drying there was maximum absorption at 825 nm, demonstrating its potential for ablation using a near-infrared laser diode.

We claim:

1. An optical recording element in which information can be recorded and read directly afterwards by means of laser light, the element comprising, as a recording medium, an information carrying layer selected from the group consisting of a dye on a substrate and a dye in a polymeric layer, said dye comprising an effective amount of one or more dyes of the formula:

$$\text{(II)}$$

in which:
n is 0 or an integer,
each A independently represents a hydrogen atom or an electron-donating group providing at least one group A is other than hydrogen,
each R independently represents a hydrogen atom, one or more substituents on the phenyl ring each selected from alkyl, alkenyl, aryl, alkaryl, alkoxy, N,N-dialkylamino, N-alkylamino, amino, amido, halogen atoms, nitro, cyano, ester, carboxyalkoxy, aldehyde, keto, carboxylate, sulfonate or alicyclic groups, any of which groups may be substituted, a fused ring or a bond or the atoms necessary to complete a cyclic structure with the adjacent group $R^1$ or the polymethine chain,
each $R^1$ independently represents a hydrogen atom, an alkyl, aryl or alkaryl group any of which groups may be substituted, $R^1$ optionally completing a cyclic structure with the polymethine chain, or with the adjacent phenyl ring via the substituent R or A,
the free bonds on the polymethine chain being satisfied by substituents independently selected from hydrogen, halogen, hydroxy, alkyl, aryl, the latter two groups being optionally substituted, or the necessary atoms to complete a cyclic structure including at least two carbon atoms in the polymethine chain, and
$X^-$ represents an organic ion, the conjugate acid of which has a pKa value less than 7 or $FSO_3$ or an inorganic ion of the formula:

$$ML_x^{p-1}$$

in which
M represents B, Al, P, As, Sb or Zn,
L represents a halogen,
x=4, 5 or 6, and
p is 1 or 2,
the group $X^-$ optionally being covalently bonded to the dye cation such that the molecule is a zwitterion, and either said substrate or said polymeric layer being pre-grooved in a circular or spiral pattern.

2. A recording element as claimed in claim 1, in which at least one of $R^1$ substituent is an aryl group, n is 0, 1 or 2 and L is F or Cl.

3. A recording element as claimed in claim 2, in which each A is selected from N,N-dialkylamino and alkoxy groups, n is 0, 1 or 2 and L is F or Cl.

4. A recording element as claimed in claim 1, in which the dye has the formula:

$$\text{(III)}$$

in which:
A, R, $R^1$, $X^\ominus$ and the free bonds are as defined in claim 1, and
$R^2$ represents a hydrogen atom or an alkyl, alkaryl or aryl group, the groups optionally being substituted, with the proviso that at least one of R, $R^1$ and the free bonds of the polymethine chain complete a cyclic structure in the manner defined with respect of formula (II).

5. The recording element of claim 1, in which $X^\ominus$ is selected from alkyl, alkenyl, aryl and polyoxyalkyl carboxylic, sulfonic, phosphoric or boric acids, any of which may be substituted.

6. The recording element of claim 1, in the form of a self-supporting film comprising a binder and one or more dyes of formula (II).

7. The recording element of claim 1, in which the support bears on a surface a recording layer comprising one or more dyes of formula (II) uniformly dispersed in a polymeric binder, either as a dye/polymer solution or a microcrystalline dispersion of dye in the binder.

8. A recording element as claimed in claim 7, in which the polymeric binder comprises poly(methylmethacrylate).

9. A recording element as claimed in claim 8, in which the polymeric binder additionally comprises a polyester, polystyrene or poly(alpha-methylstyrene).

10. The recording element of claim 7, in which the surface of the substrate to which the recording layer is applied to light reflective or a reflecting layer is interposed between the recording layer and substrate.

11. The recording element of claim 1, in which a dielectric layer is interposed between the recording layer and substrate.

12. The recording element of claim 1, in which the recording layer has a thickness of less than 1 micrometer.

13. The recording element of claim 12, in which the recording layer has a thickness in the range 30 to 300 nm.

14. The recording element of claim 7, in which the weight ratio of dye:binder in the recording layer is from 1:30 to 5:1.

15. The recording element of claim 7, in which the substrate is substantially planar having on each major surface a reflecting layer above which is coated a recording layer.

16. The recording element of claim 1, in which the top surface of the recording medium is protected by an overcoat layer of material transparent to near infrared radiation either directly in contact with it or separated from it by a clean, sealed, air, nitrogen or vacuum gap.

17. An optical recording element in which laser readable information, selected from the group consisting of digital and analog information, is stored in the form of laser readable detectable marks in a layer comprising an amount of a dye sufficient to absorb laser radiation and produce laser readable detectable marks, said dye comprising one or more dyes of the formula:

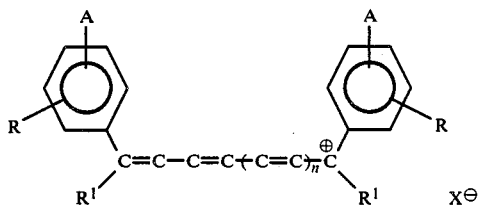

(II)

in which:
n is 0 or an integer,
each A independently represents a hydrogen atom or an electron-donating group providing at least one group A is other than hydrogen,
each R independently represents a hydrogen atom, one or more substituents on the phenyl ring each selected from alkyl, alkenyl, aryl, alkaryl, alkoxy, N,N-dialkylamino, N-alkylamino, amino, amido, halogen atoms, nitro, cyano, ester, carboxyalkoxy, aldehyde, keto, carboxylate, sulfonate or alicyclic groups, any of which groups may be substituted, a fused ring or a bond or the atoms necessary to complete a cyclic structure with the adjacent group $R^1$ or the polymethine chain, each $R^1$ independently represents a hydrogen atom, an alkyl, aryl or alkaryl group any of which groups may be substituted, $R^1$ optionally completing a cyclic structure with the polymethine chain, or with the adjacent phenyl ring via the substituent R or A, the free bonds on the polymethine chain being satisfied by substituents independently selected from hydrogen, halogen, hydroxy, alkyl, aryl, the latter two groups being optionally substituted, or the necessary atoms to complete a cyclic structure including at least two carbon atoms in the polymethine chain, and $X^-$ represents an organic ion, the conjugate acid of which has a pKa value less than 7 or $FSO_3^-$ or an inorganic ion of the formula:

$$ML_x{}^{p-1}$$

in which M represents B, Al, P, As, Sb or Zn,
L represents a halogen, preferably F or Cl,
x=4, 5 or 6, and
p is 1 or 2,
the group $X^-$ optionally being covalently bonded to the dye cation such that the molecule is a zwitterion, said layer being in the form of a layer on a substrate or a layer of dye in a polymer.

18. The element of claim 17 wherein said layer comprises a polymeric material and said dyes, and said layer is on a substrate.

19. The element of claim 17 wherein said layer comprises only dye and said layer is on a substrate.

20. An optical recording element in which information can be recorded and read directly afterwards by means of laser light, the element comprising, as a recording medium, a recording layer selected from the group consisting of a substrate bearing a dye and a dye in a polymeric layer, said dye comprising an effective amount of one or more dyes of the formula:

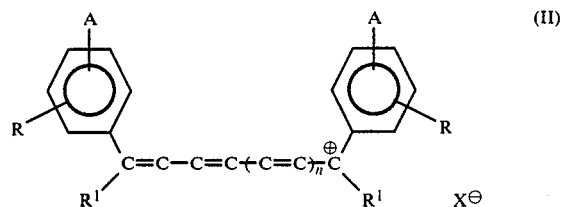

(II)

in which:
n is 0 or an integer,
each A independently represents a hydrogen atom or an electron-donating group providing at least one group A is other than hydrogen,
each R independently represents a hydrogen atom, one or more substituents on the phenyl ring each selected from alkyl, alkenyl, aryl, alkaryl, alkoxy, N,N-dialkylamino, N-alkylamino, amino, amido, halogen atoms, nitro, cyano, ester, carboxyalkoxy, aldehyde, keto, carboxylate, sulfonate or alicyclic groups, any of which groups may be substituted, a fused ring or a bond or the atoms necessary to complete a cyclic structure with the adjacent group $R^1$ or the polymethine chain, each $R^1$ independently represents a hydrogen atom, an alkyl, aryl or alkaryl group any of which groups may be substituted, $R^1$ optionally completing a cyclic structure with the polymethine chain, or with the adjacent phenyl ring via the substituent R or A, the free bonds on the polymethine chain being satisfied by substituents independently selected from hydrogen, halogen, hydroxy, alkyl, aryl, the latter two groups being optionally substituted, or the necessary atoms to complete a cyclic structure including at least two carbon atoms in the polymethine chain, and $X^-$ represents an organic ion, the conjugate acid of which has a pKa value less than 7 or $FSO_3^-$ or an inorganic ion of the formula:

$$ML_x{}^{p-1}$$

in which

M represents B, Al, P, As, Sb or Zn,

L represents a halogen, x=4, 5 or 6, and p is 1 or 2, the group $X^-$ optionally being covalently bonded to the dye cation such that the molecule is a zwitterion, and said recording layer having an indexing function readable by laser light.

21. A recording element as claimed in claim 20, in which each A is selected from N,N-dialkylamino and alkoxy groups, n is 0, 1 or 2 and L is F or Cl.

22. A recording element as claimed in claim 20, in which $X^\ominus$ is derived from formic, acetic, propanoic, butyric, lauric, stearic, behenic, oleic or linoleic acids, n is 0, 1 or 2 and L is F or Cl.

23. A recording element as claimed in claim 20, in which $X^\ominus$ is derived from halo-substituted alkyl or aryl carboxylic or sulfonic acids, n is 0, 1 or 2 and L is F or Cl.

24. A recording element as claimed in claim 23, in which $X^\ominus$ is derived from trifluoromethyl sulfonic acid, perfluroroproanoic acid, perfluorobutyric acid or perfluorooctanoic acid.

* * * * *